Figure 1:
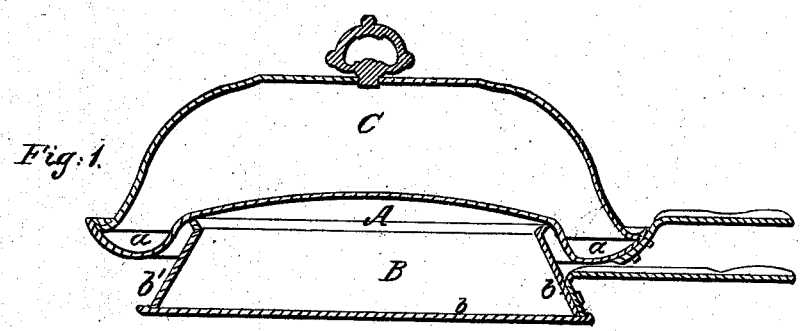

B. MARSHALL.
Broiler.

No. 104,611.

Patented June 21, 1870.

Witnesses.
J. H. Parson
S. J. Noyes

Inventor.
Benjamin Marshall by
H. W. Beadle atty

United States Patent Office.

BENJAMIN MARSHALL, OF MARIETTA, OHIO.

Letters Patent No. 104,611, dated June 21, 1870.

BROILER.

The Schedule referred to in these Letters Patent and making part of the same.

*To all whom it may concern:*

Be it known that I, BENJAMIN MARSHALL, of Marietta, in the county of Washington and State of Ohio, have invented a new and useful Improvement in Broiler; and I do hereby declare that the following is a full and exact description of the same, reference being had to the accompanying drawing and to the letters of reference marked thereon.

This invention consists mainly in constructing a broiler of a continuous sheet of metal, preferably circular in form, which has its highest point at its center.

It further consists, also, in providing a broiler, so constructed with a reservoir, air-chamber, and cover, as will be fully described hereinafter.

In the drawing—

Figure 1 represents a sectional elevation of my improved broiler, and

Figure 2:
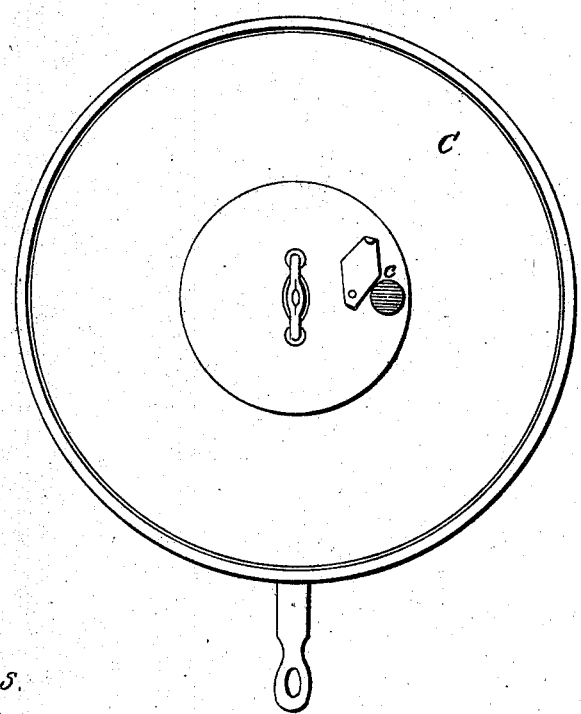

Figure 2, a plan view of the same.

To enable others skilled in the art to make and use my invention, I will now proceed to describe fully its construction and method of operation.

A represents the broiler proper, which consists of a continuous sheet of metal, having its highest part at its center, and gradually inclining toward its edge. It is provided with a reservoir, $a$, which consists of a deep groove formed upon its outer edge, as shown in the drawing.

B represents an air-chamber, formed by means of the base $b$ and inclined sides $b'$. This part of the utensil corresponds in size with the part A, and rests directly beneath it, and forms its support.

C represents a cover, which may be of any suitable size and shape, and which is provided with a valve, $c$.

The manner of using my improved broiler is as follows:

The part B is placed upon the stove, with the part A resting upon it. The meat or other article to be cooked is placed upon the inclined surface, and is covered by means of the cover C. By means of the air-chamber, a uniform and not excessive heat is concentrated beneath the central part of the broiler A, and the meat is consequently quickly and uniformly cooked throughout every part. No smoke or gas from the burning coals can reach it and affect its flavor. Its juices, also, as fast as they are forced out of the meat, must necessarily run down into the reservoir, and it is therefore impossible for it to be fried in them. The location of the reservoir above and outside of the air-chamber, where it is exposed to comparatively cool currents of air, prevents the possibility of the gravy being burned.

By means of the valve in the cover, the degree of moisture to be retained by the meat may be easily regulated.

By means of my improved utensil any kind of meat or game may be readily broiled or roasted; and it is found to be especially adapted for cooking such articles as have been highly seasoned with salt, such as ham, fish, &c., inasmuch as the steam arising from the cooking operation, being confined therein by the cover, the valve being closed, has a tendency to freshen them, the exceedingly salt gravy being caught, of course, in the reservoir.

The broiler may be used also for stewing such articles as easily burn, and require a gentle heat, by simply inverting it.

I do not limit myself to any specific form in regard to the general outlines, for it may be made oblong, or even square; but

Having thus fully described my invention,

What I claim as new, and desire to secure by Letters Patent, is—

1. A broiler formed of a continuous sheet of metals, having its highest point at its center, as described.

2. The broiler A, with reservoir $a$, as described.

3. The broiler A and chamber B, when combined as described, for the purpose set forth.

4. The broiler A, chamber B, and cover C, with valve $c$, when combined as described, for the purpose set forth.

This specification signed and witnessed this 18th day of May, 1870.

BENJAMIN MARSHALL.

Witnesses:
 JOHN NEWTON,
 HENRY HAY.